(12) United States Patent
Matsuda et al.

(10) Patent No.: US 9,357,119 B2
(45) Date of Patent: May 31, 2016

(54) IMAGING APPARATUS CAPABLE OF WIRELESS COMMUNICATION

(71) Applicant: CASIO COMPUTER CO., LTD., Shibuya-ku, Tokyo (JP)

(72) Inventors: Hideaki Matsuda, Tokyo (JP); Koki Nakamura, Sakado (JP); Hiroyoshi Ogawa, Koganei (JP); Kazuma Kawahara, Akishima (JP); Jun Muraki, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/311,999

(22) Filed: Jun. 23, 2014

(65) Prior Publication Data
US 2015/0029350 A1 Jan. 29, 2015

(30) Foreign Application Priority Data

Jul. 29, 2013 (JP) .................................. 2013-156962

(51) Int. Cl.
*H04N 5/232* (2006.01)
*H04N 5/225* (2006.01)
*H04N 5/247* (2006.01)

(52) U.S. Cl.
CPC ............ *H04N 5/23203* (2013.01); *H04N 5/247* (2013.01)

(58) Field of Classification Search
USPC ...................................................... 348/207.1
See application file for complete search history.

(56) References Cited

U.S. PATENT DOCUMENTS

| 2005/0096084 A1* | 5/2005 | Pohja et al. ................ 455/556.1 |
| 2008/0297615 A1* | 12/2008 | Kagawa et al. ............ 348/222.1 |
| 2012/0307079 A1* | 12/2012 | Yumiki .............. H04N 5/23203 348/207.1 |

FOREIGN PATENT DOCUMENTS

| JP | 2007019936 A | 1/2007 |
| JP | 2010268127 A | 11/2010 |
| JP | 2012151527 A | 8/2012 |
| JP | 2013131065 A | 7/2013 |

OTHER PUBLICATIONS

Japanese Office Action dated Jan. 28, 2015, issued in counterpart Japanese Application No. 2013-156962.

* cited by examiner

*Primary Examiner* — Roberto Velez
*Assistant Examiner* — Stephen Coleman
(74) *Attorney, Agent, or Firm* — Holtz, Holtz & Volek PC (57) ABSTRACT

An imaging apparatus of the present invention, which is capable of wireless communication, images a peripheral imaging apparatus from among a plurality of peripheral imaging apparatuses around the imaging apparatus; detects predetermined information by which identification information identifying the peripheral imaging apparatus is identifiable from within the imaging frames; identifies the identification information by analyzing the detected predetermined information; selects a peripheral imaging apparatus to be a target for predetermined processing from among the plurality of peripheral imaging apparatus by using the identified identification information; and performs the predetermined processing with the selected peripheral imaging apparatus via the wireless communication.

15 Claims, 8 Drawing Sheets

LIVE VIEW SCREEN OF
SUBJECT-HELD CAMERA

IMAGING APPARATUS CAPABLE OF WIRELESS COMMUNICATION

CROSS-REFERENCE TO RELATED APPLICATION

This application is based upon and claims the benefit of priority from the prior Japanese Patent Application No. 2013-156962, filed Jul. 29, 2013, the entire contents of which are incorporated herein by reference.

BACKGROUND OF THE INVENTION

1. Field of the Invention

The present invention relates to an imaging apparatus capable of wireless communication, an imaging method, and a program.

2. Description of the Related Art

As an example of technology for data communication between imaging apparatuses (cameras) such as digital still cameras or video cameras, a technology is known in which a light-emitting section included in one camera is imaged by another camera, and a light-emitting pattern emitted from the light-emitting section of the one camera is detected in the image captured by the other camera, whereby data communication (visible-light communication) is performed between them (Japanese Patent Application Laid-Open (Kokai) Publication No. 2007-019936).

SUMMARY OF THE INVENTION

In accordance with one aspect of the present invention, there is provided an imaging apparatus capable of wireless communication, comprising: an imaging section which images a peripheral imaging apparatus from among a plurality of peripheral imaging apparatuses around the imaging apparatus; a detecting section which detects predetermined information by which identification information identifying the peripheral imaging apparatus is identifiable, from within imaging frames imaged by the imaging section; an identifying section which identifies the identification information by analyzing the predetermined information detected by the detecting section; a selecting section which selects a peripheral imaging apparatus to be a target for predetermined processing from among the plurality of peripheral imaging apparatuses by using the identification information identified by the identifying section; and a processing control section which performs the predetermined processing with the peripheral imaging apparatus selected by the selecting section via the wireless communication.

In accordance with another aspect of the present invention, there is provided an imaging method comprising: a step of detecting predetermined information by which identification formation identifying a peripheral imaging apparatus identifiable, from within imaging frames where one of a plurality of peripheral imaging apparatuses in a surrounding area has been imaged; a step of identifying the identification information by analyzing the detected predetermined information; a step of selecting a peripheral imaging apparatus to be a target for predetermined processing from among the plurality of peripheral imaging apparatuses by using the identified identification information; and a step of performing the predetermined processing with the selected peripheral imaging apparatus via wireless communication.

In accordance with another aspect of the present invention, there is provided a non-transitory computer-readable storage medium having stored thereon a program that is executable by a computer, the program being executable by the computer to perform functions comprising: processing for detecting predetermined information by which identification information identifying a peripheral imaging apparatus is identifiable, from within imaging frames where one of a plurality of peripheral imaging apparatuses in a surrounding area has been imaged; processing for identifying the identification information by analyzing the detected predetermined information; processing for selecting a peripheral imaging apparatus to be a target for predetermined processing from among the plurality of peripheral imaging apparatuses by using the identified identification information; and processing for performing the predetermined processing with the selected peripheral imaging apparatus via wireless communication.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Hereafter, embodiments of the present invention are described in detail with reference to the drawings.

First Embodiment

First, a first embodiment of the present invention is described with reference to FIG. 1 to FIG. 5.

Figure 1:
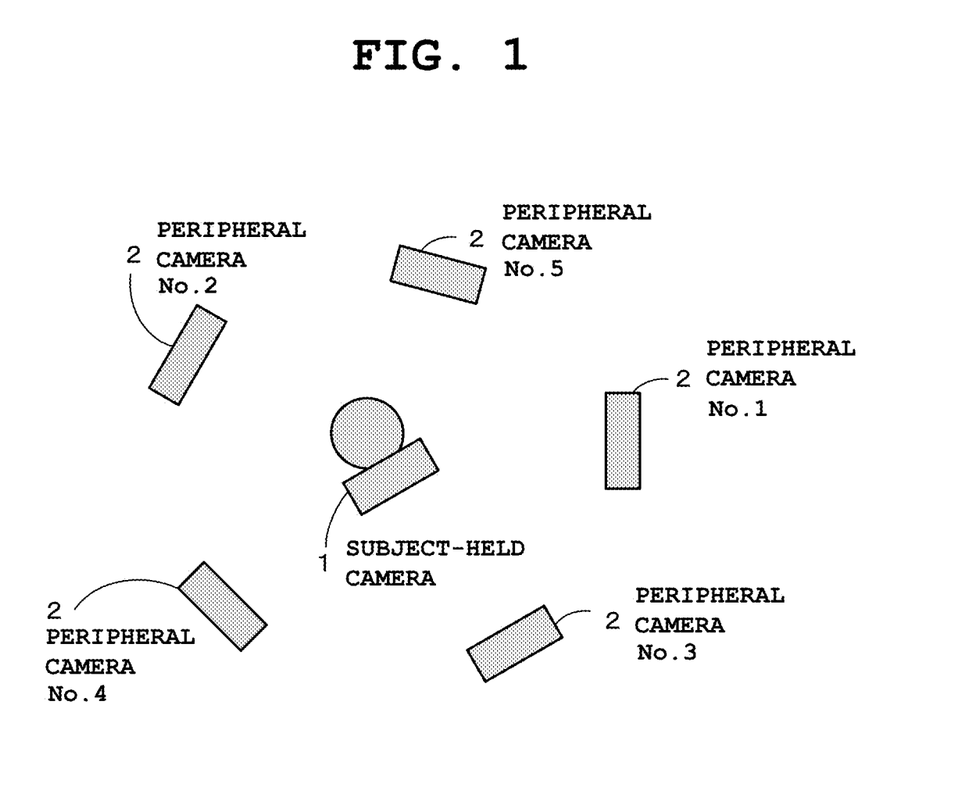
FIG. 1 is a block diagram depicting an arrangement status of a plurality of peripheral cameras 2 arranged around a subject.

FIG. 1 is a block diagram depicting an arrangement status of a plurality of imaging apparatuses (cameras) arranged around a subject.

When performing self imaging in which a user, who is the photographic subject, images himself or herself from the surrounding area, the subject holds an imaging apparatus (camera) 1 and a plurality of other imaging apparatuses (cameras) 2 are stationarily arranged around the position for self-imaging (Imaging position) by using tripods or the like. In the case of the example in FIG. 1, five cameras 2 indicated by "No. 1 to No. 5" are arranged around the camera 1 held by the subject (oneself)) so as to capture moving images or still images of his or her own image (for example, oneself during a dance lesson).

Note that the camera 1 held by the subject (oneself)) is hereinafter referred to as "subject-held camera 1", and the plurality of other cameras 2 arranged around the subject-held camera 1 are referred to as "peripheral cameras (peripheral imaging apparatuses) 2". Also, the subject-held camera 1 and the peripheral cameras 2 may be distinguished according to the usage. That is, when the user arbitrarily selects one of the plurality of peripheral cameras 2 as a camera to be used (held), this selected camera is regarded as the subject-held camera 1. Conversely, when the user arranges the subject-held camera 1 around the subject (user), this arranged camera is regarded as a peripheral camera 2. As such, the subject-held camera 1 and the peripheral camera 2 may have a relative relation.

The subject-held camera 1 and each of the peripheral cameras 2 have, for example, a short-range wireless communication function such as a function using a wireless LAN (Local Area Network) or Bluetooth (registered trademark) with a communication effective range of about tens meters. The subject-held camera 1 can transmit and receive, via short-range wireless communication, various commands and image data to and from a peripheral camera 2 arbitrarily selected by the user (subject) from among the plurality of (in the example, five) peripheral cameras 2 arranged around the subject-held camera 1. When the user (subject) directs the subject-held camera 1 toward a desired peripheral camera 2 of the plurality of peripheral cameras 2 arranged around the subject-held camera 1, a wireless communication connection is established between the subject-held camera 1 and the peripheral camera 2 at that desired position so as to allow data transmission and reception, whereby an image captured by that peripheral camera 2 is transferred to the subject-held camera 1 and displayed on the monitor screen. By the image captured by the peripheral camera 2 being transferred to the subject-held camera 1 and displayed on the monitor screen, the user who is the photographic subject can examine his or her own image on the spot.

Figure 2:
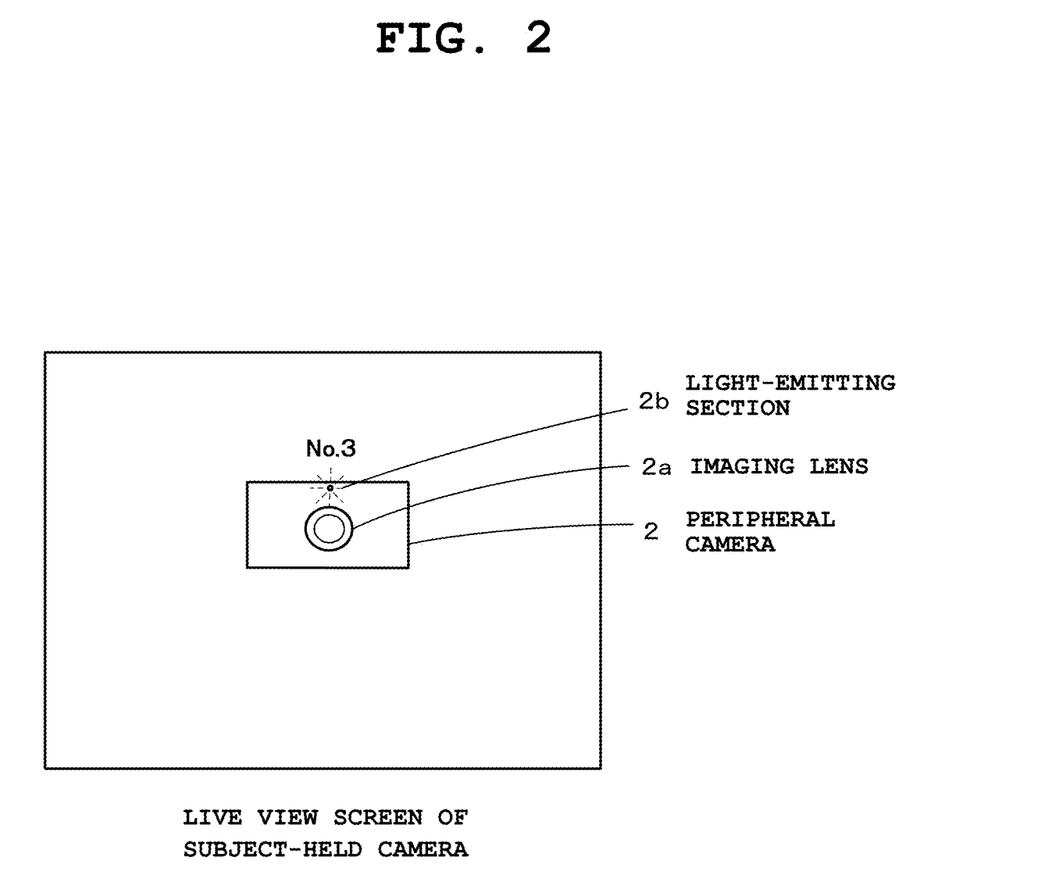
FIG. 2 is a diagram of a monitor screen (live view screen) where a live view image is displayed when a camera 1 held by a subject is directed toward a peripheral camera 2 arranged at a desired position and performs aging.

FIG. 2 is a diagram of a live view screen where a live view image is displayed when the user directs the subject-held camera 1 toward a peripheral camera 2 arranged at a desired position and performs image capturing for examining his or her own image.

FIG. 2 shows a display example of the live view screen of the subject-held camera 1, in which the peripheral camera 2 indicated by "No. 3" is included in an imaging frame at the center of the live view screen. On this live view screen (imaging frame), "No. 3" indicating an arrangement position is superimposed and displayed corresponding to an image captured by the peripheral camera 2.

Each of the peripheral cameras 2 includes a light-emitting section 2b provided at the center of the upper end on its surface side (imaging lens 2a side), which emits visible light. This light-emitting section 2b, which includes a visible light element such as an LED (Light Emitting Diode), is structured to be able to transmit identification information (camera ID) assigned in advance to its own peripheral camera 2 via visible light communication. For example, the light-emitting section 2b transmits a light-emitting pattern (blinking pattern) indicating a camera ID by driving the visible light element to blink at high speed. The camera ID is set in advance to each peripheral camera 2. For example, a unique ID formed of date and time and its arrangement position ("No. 1 to No. 5") is used. This camera ID, which is set in advance to each peripheral camera 2, individually set by a key operation for each peripheral camera 2, or set and assigned by being generated and transmitted by the subject-held camera 1 to each peripheral camera 2.

When the subject-held camera 1 is directed toward a peripheral camera 2 at a desired position with a blinking pattern (camera ID) being sent from each peripheral camera 2, the subject-held camera 1 detects a light-emitting portion of the peripheral camera 2 captured in the imaging frame on the live view screen based on its size and the level of the luminance, and sequentially detects a light-emitting pattern (blinking pattern) at that light-emitting portion. This blinking pattern is predetermined information by which the camera ID can be identified. The subject-held camera 1 analyzes it and thereby identifies the camera ID. Then, by using the identified camera ID, the subject-held camera 1 selects the peripheral camera 2 as a target for predetermined processing from among the plurality of peripheral cameras 2 peripherally arranged. Note that visible light communication has strong directivity and less interference, and therefore the camera ID can be identified only by the subject-held camera 1 being directed toward the desired peripheral camera 2.

In the present embodiment, the above-described predetermined processing is processing in which a peripheral camera 2 selected as a target for the processing and the subject-held camera 1 perform an imaging operation in cooperation with each other. For example, the predetermined processing is transfer processing in which a peripheral camera 2 selected as a processing target is requested to transfer an mage and a captured image transmitted in response thereto from peripheral camera 2 via wireless communication is loaded and recorded. That is, in this transfer processing, a self-imaging command (moving-image capturing command) is transmitted to a peripheral camera 2 and, at its transmission timing (or after a predetermined time from the transmission timing), a moving image captured by this peripheral camera 2 is received and recorded. Alternatively, in this transfer processing, a self-imaging command (multi consecutive photographing command) instructing a peripheral camera 2 to capture a plurality of successive still images (multi consecutive photographing) is transmitted, and an image captured by the peripheral camera 2 by multi consecutive photographing (which is also called as a photographic playback, that is, one image having a plurality of images consecutively photographed embedded on a time-series basis) is received and recorded. As such, in the present embodiment, processing for transferring a captured image is described as an example of the predetermined processing (cooperative imaging operation). However, the predetermined processing is not limited thereto, and may be any processing. For example, processing may be performed in which the imaging timing of the subject-held camera 1 and the imaging timing of the peripheral camera 2 are synchronized with each other, or still-image capturing and moving-image capturing are synchronized with each other.

Figure 3:
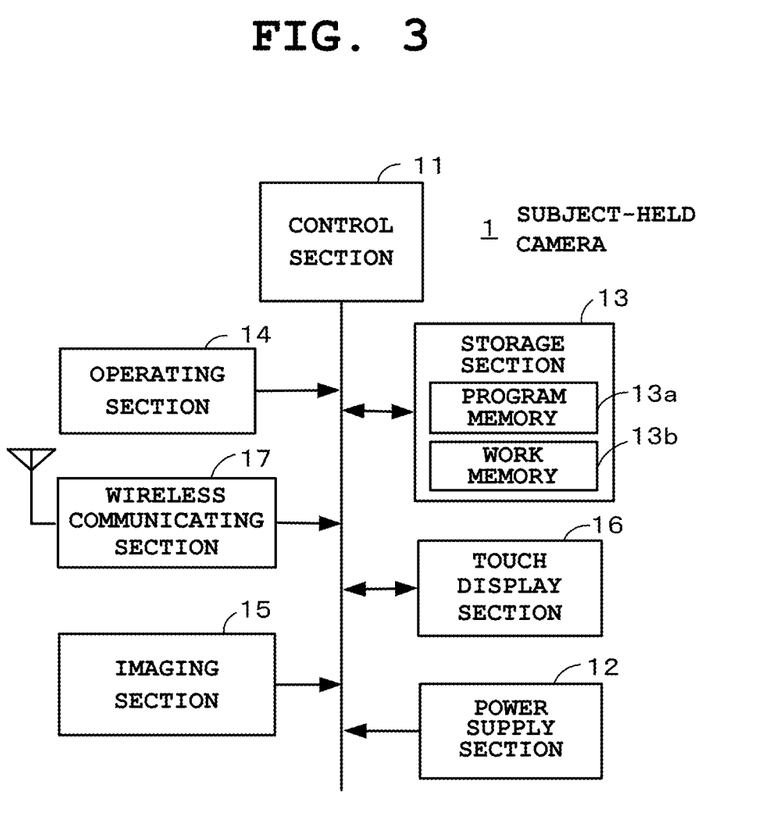
FIG. 3 is a block diagram depicting basic components of the subject's camera 1.

FIG. 3 is a block diagram depicting basic components of the subject-held camera 1. Note that, although the components of each peripheral camera 2 are basically the same as those of the subject-held camera 1 and therefore omitted in the drawings, each peripheral camera 2 includes the light-emitting section 2b which transmits its camera ID assigned in advance via visible light communication, as described above.

The subject-held camera 1 as a compact camera or a single-lens reflex camera capable of capturing not only still images but also moving images, and has basic functions such as an imaging function and a clock function as well as a wireless communication function. A control section 11 of the subject-held camera 1 operates upon power supply from a power supply section (secondary battery) 12, and controls an entire operation of the subject-held camera 1 according to various programs stored in a storage section 13. This control section 11 includes a CPU (Central Processing Unit), a memory, and the like not depicted in FIG. 3.

The storage section 13 is structured to include, for example, a ROM (Read-Only Memory) or a flash memory, and has a program memory 13a having stored therein a program, various applications, and the like for achieving the present embodiment according to an operation procedure depicted in FIG. 4 described below, and a work memory 13b that temporarily stores various information (for example, a flag and measurement time) required for the subject-held camera 1 to operate. Note that the storage section 13 may be structured to include, for example, a removable portable memory (recording medium) such as a SD (Secure Digital) card or an IC (Integrated Circuit) card, or may be structured to include, although not shown, a storage area on a predetermined server device side in a case where the subject-held camera 1 is connected to a network via the communication function.

An operating section 14 of the subject-held camera 1 includes press-button keys such as a power supply key for power ON/OFF instructions, a mode change key for switching between various imaging modes such as a self-imaging mode and a replay mode, and a shutter key for instructing to start imaging. The control section 11 performs, for example, mode change processing and imaging processing in accordance with an input operation signal outputted from the operating section 14 in response to the operation of an operation key. The self-imaging mode is an imaging mode for capturing a self-image by using each peripheral camera 2 arranged around the subject (the user himself or herself). An imaging section 15 of the subject-held camera 1, which constitutes a camera section capable of photographing a subject with high definition by a subject image from an optical lens being formed on an image sensor such as a CCD (Charge-Coupled Device) or CMOS (Complementary Metal Oxide Semiconductor) omitted in the drawings, includes a capturing lens (for example, a zoom lens), the image sensor, a strobe, various sensors, an analog processing section, and a digital processing section. An image signal (analog-value signal) obtained by photoelectric conversion by the image sensor is subjected to color separation and gain adjustment for each of color components of R, G, and B, converted to digital-value data, subjected to color interpolation processing (de-mosaic processing), and displayed in full-color on a touch display section 16.

The touch display section 16 is structured by a touch panel 16b being laminated and arranged on a display panel 16a. The display panel 16a is a high-definition liquid-crystal display or an organic EL (Electro Luminescence) display, and serves as a monitor screen (live view screen) for displaying an image to be captured (live view image) or a replay screen for replaying a captured image. The touch panel 16b constitutes a touch screen for detecting a point touched by a finger or the like of the user and inputting the coordinate data of this point. A wireless communicating section 17 of the subject-held camera 1, which constitutes a wireless LAN or Bluetooth (registered trademark) communication function, performs short-range wireless communication with the peripheral cameras 2.

As such, the subject imaging apparatus (subject-held camera) 1 in the first embodiment is structured to include an imaging section (the control section 11 and the imaging section 15) which images one of the plurality of imaging apparatuses (peripheral cameras) 2 arranged around the camera 1, a detecting section (the control section 11 and the storage section 13) which detects, from within an imaging frame imaged by the imaging section, predetermined information by which identification information (camera ID) identifying the plurality of peripheral imaging apparatuses can be identified, an identifying section (the control section 11 and the storage section 13) which analyzes the predetermined information detected by the detecting section and identifies the identification information, a selecting section (the control section 11 and the storage section 13) which selects an imaging apparatus to be subjected to predetermined processing (such as processing of transferring a captured image) from among the plurality of peripheral imaging apparatuses by using the identification information identified by the identifying section, and a processing control section (the control section 11, the storage section 13, and the wireless communicating section 17) which performs the predetermined processing with the peripheral imaging apparatus selected by the selecting section via wireless communication.

Next, the operational concept of the subject-held camera 1 in the first embodiment is described with reference to a flowchart depicted in FIG. 4. Here, each function described in the flowchart is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. This applies to other embodiments described later.

Figure 4:
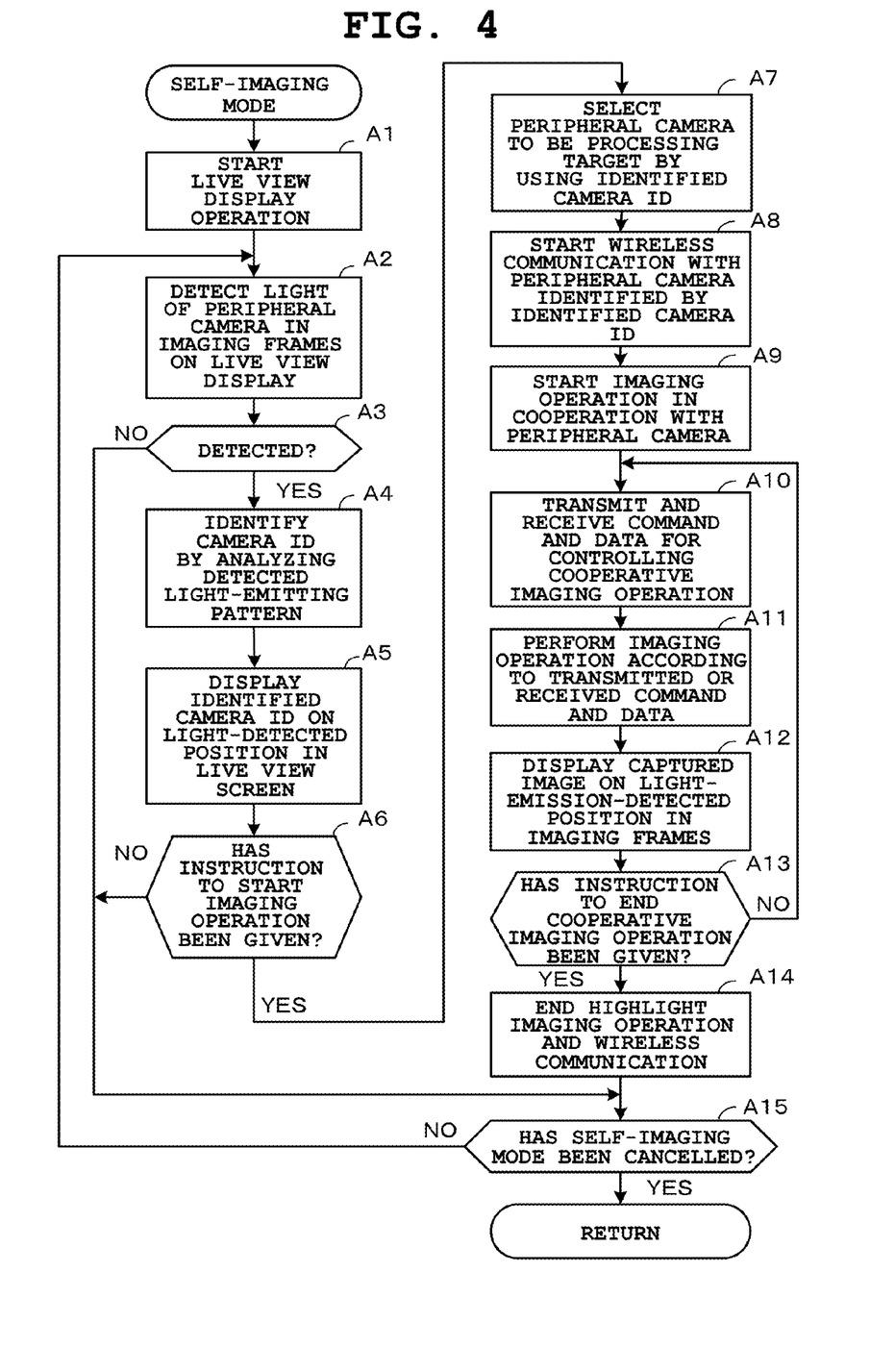
FIG. 4 is a flowchart of operation in a self-imaging mode of the subject's camera 1 in a first embodiment.

FIG. 4 is a flowchart describing an operation in the self-imaging mode of the subject-held camera 1, which started when a current mode is switched to the self-imaging mode by the above-described mode switching key. Note that the flowchart in FIG. 4 outlines the operation of the characteristic portion of the present embodiment from among all of the operations of the subject-held camera 1. After exiting the flow in FIG. 4, the procedure returns to the main flow (omitted in the drawings) of the overall operation.

Before switching a current mode to the self-imaging mode, the user of the subject-held camera 1 arranges the plurality of peripheral cameras 2 at arbitrary positions around the subject (the user himself or herself) (in this case, each peripheral camera 2 may be fixed to a tripod or the like, or be arranged to be movable by being held by a person). Here, each peripheral camera 2 reads out its own camera ID assigned in advance and repeatedly sends a light-emitting pattern (blinking pattern) indicating the camera ID from the light-emitting section 2b. In this state, the user switches the current mode to the self-imaging mode, directs the subject-held camera 1 toward a peripheral camera 2 at a desired position, and images the peripheral camera 2 so as to cause this peripheral camera 2 at the desired position to image his or her own image (for example, oneself during a dance lesson).

First, when a current mode is switched to the self-imaging mode, the control section 11 of the subject-held camera 1 starts a live view display operation by which images in imaging frames taken in the image sensor constituting the imaging section 15 are sequentially displayed on the monitor screen as a live view image (Step A1). Then, the control section 11 performs processing for detecting whether light emitted from the light-emitting section 2b of a peripheral camera 2 is included in the imaging frames where the live view image is being displayed (Step A2). This detection of light emission is performed by making a comprehensive judgment based on the luminance, size, color, and the like of light (Step A3).

Here, when light emitted from the light-emitting section 2b of a peripheral camera 2 is not detected (NO at Step A3), the control section 11 judges that the subject-held camera 1 has not been directed toward any of the peripheral cameras 2, and proceeds to Step A15 to judge whether the self-imaging mode has been cancelled. Hereafter, until the self-imaging mode is canceled, the control section 11 repeatedly returns to Step A2 and continues the light detection processing.

At Step A3, when light emitted from the light-emitting section 2b of a peripheral camera 2 (YES at Step A3) is detected, the control section 11 judges that the subject-held camera 1 has been directed toward a peripheral camera 2, and proceeds to Step A4. At Step A4, the control section 11 sequentially detects the change of light in each imaging frame on a time-series basis, analyzes a light-emitting pattern of the changes, and thereby identifies the camera ID. Then, the control section 11 obtains part of data (for example, one of "No. 1 to No. 5" indicating arrangement positions) from the identified camera ID, and displays the obtained data by superimposing it on the light-emission-detected point on the live view screen (Step A5). FIG. 2 depicts a live view screen (imaging frame) when the subject-held camera 1 is directed toward the peripheral camera 2 of "No. 3" for imaging. In this state, the control section 11 judges whether an instruction to start a cooperative imaging operation has been given (Step A6). That is, the control section 11 judges whether a user operation has been performed for instructing the peripheral camera 2 and the subject-held camera 1 to perform a cooperative imaging operation. Here, the user performs an operation of instructing to start an imaging operation, and then lets go of the subject-held camera 1 so as to dance as a photographic subject.

Here, when judged that an instruction to start an imaging operation has not been given (NO at Step A6), the control section 11 proceeds to Step A15 described above. However, when judged that an instruction to start an imaging operation has been given (YES at Step A6), the control section 11 selects a peripheral camera 2 to be subjected to predetermined processing from among the plurality of peripheral cameras 2 by using the latest camera. ID that has been identified at the time of this instruction (Step A7), and then starts wireless communication between the peripheral camera 2 selected as a processing target and the subject-held camera 1 (Step A8). Here, in the present embodiment, since "No. 1 to No 5" each indicating the arrangement position of the relevant peripheral camera 2 are taken as camera IDs, the control section 11 refers to a correspondence table (omitted in the drawings) where these camera IDs and IDs for wireless communication (such as MAC (Media Access Control) addresses) have been stored in association with each other in advance, converts the identified camera ID to an ID for communication, and starts wireless communication. Note that, in a configuration where the camera IDs themselves are IDs for communication (such as MAC addresses) by which a counterpart is identified at the time of wireless communication, the above-described wireless communication may be started without the conversion.

Figure 5:
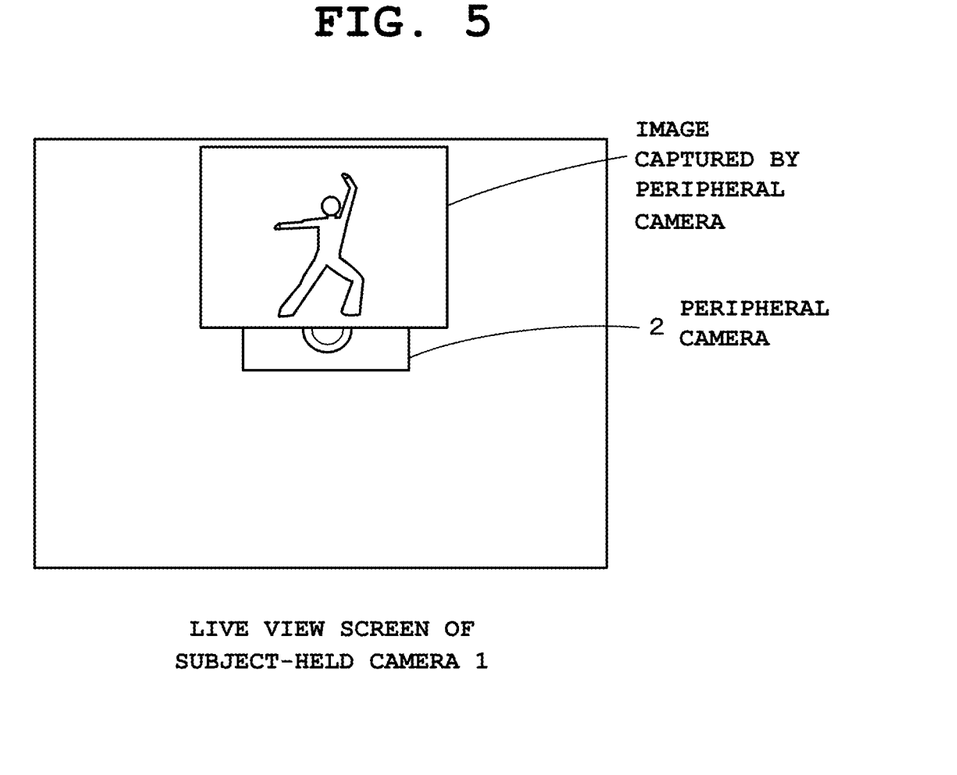
FIG. 5 is a diagram depicting a state in which an image captured by the peripheral camera 2 has been loaded and displayed by being superimposed on a predetermined area of a live view screen.

Next, the control section 11 starts an imaging operation that is performed by the peripheral camera 2 and the subject-held camera 1 cooperatively (Step A9). Then, after starting the cooperative imaging operation, the control section 11 transmits and receives a command and data for controlling the cooperative imaging operation between the peripheral camera 2 and the subject-held camera 1 (Step A10), and performs the cooperative imaging operation according to the transmitted or received command and data (Step A11). For example, as described above, the control section 11 performs processing for transmitting a self-imaging command (moving-image capturing command) to the peripheral camera 2 and loading and recording an image (moving image) captured at this transmission timing (or after a predetermined time from the transmission timing) by the peripheral camera 2. Subsequently, the control section 11 causes the captured image to be displayed on the light-emission-detected point in the imaging frames on the live view screen (Step A12). FIG. 5 depicts a live view screen of this case, in which an image (an image during the dance lesson) captured by the peripheral camera 2 is being displayed by being superposed on the light-emission-detected point on the live view image.

Next, the control section 11 judges whether a user operation for instructing to end the cooperative imaging operation (Step A13) has been performed. Then, until this ending instruction is made, the control section 11 repeatedly returns to Step A10 described above and continues the cooperative imaging operation.

When an instruction to end the cooperative imaging operation is given (YES at Step A13), the control section 11 ends the cooperative imaging operation and the wireless communication (Step A14), and judges whether the self-imaging mode has been cancelled (Step A15). Then, until the self-imaging mode is cancelled, the control section 11 repeatedly returns to Step A2 and performs the above-described operations.

When judged that the self-imaging mode has been cancelled (YES at Step A15), the control section 11 exits the flow of FIG. 4. Here, in the state where captured images have been loaded from the desired peripheral camera 2 and recorded, when the self-imaging mode is switched to the replay mode and an instruction to replay the captured images is given by a user operation, the captured images are displayed on a replay screen.

As described above, in the first embodiment, when one of the plurality of peripheral cameras 2 around the subject-held camera 1 is imaged, the subject-held camera 1 detects, from within the imaging frame, predetermined information by which the camera ID identifying this peripheral camera 2 can be identified, and identifies the camera ID for communication by analyzing the predetermined information. Then, by using the camera ID for communication, the subject-held camera 1 selects the peripheral camera 2 as a target for predetermined processing from among the plurality of peripheral cameras 2. As a result of this configuration, in the situation where there are a plurality of peripheral cameras 2 capable of wireless data communication with the subject-held camera 1, selective data communication can be easily performed with a desired peripheral camera 2 (for example, a camera arranged in a direction suitable for imaging the subject) only by the peripheral camera 2 being imaged and an instruction being sent to the peripheral camera 2. Also, since the communication medium for identifying the camera ID (light) is different from the communication medium for the data communication (electric waves), the data communication between the subject-held camera 1 and the peripheral camera 2 after the camera ID is identified can be continued without the peripheral camera 2 that is the counterpart for the data communication being continuously imaged. Accordingly, the user can let go of the subject-held camera 1 during the communication, and thereby can more freely move.

Also, when the camera IDs assigned in advance to the plurality of peripheral cameras 2 are being transmitted therefrom by the light-emitting pattern of visible light, the subject-held camera 1 detects light emission within an imaging frame including an imaged peripheral camera 2, analyzes the emitting pattern, and identifies the camera ID. As a result of this configuration, a camera ID can be sent via visible light communication, whereby reliable communication can be performed without interference even when the plurality of peripheral cameras 2 are adjacent to each other.

Moreover, when sequentially identifying the camera ID of a peripheral camera 2, the subject-held camera 1 selects a peripheral camera 2 indicated by the latest camera ID identified at a specified timing as a processing target. As a result of this configuration, even when the subject-held camera 1 is directed toward peripheral cameras 2 at different positions one after another, the most recently imaged peripheral camera 2 can be selected as a processing target.

Furthermore, the subject-held camera 1 sequentially displays, on a live view screen, the camera ID of a peripheral camera 2 sequentially identified. As a result of this configuration, a peripheral camera 2 toward which the subject-held camera 1 has been directed can be sequentially identified from the display contents of the live view screen.

Still further, the predetermined processing is transfer processing for requesting a peripheral camera 2 selected as a processing target to transfer an image captured thereby, and loading the captured image transmitted from the peripheral camera 2 in response to the request. As a result of this configuration, an mage captured by a desired peripheral camera 2 can be obtained in real time.

Yet still further, the subject-held camera 1 causes a captured image loaded from a peripheral camera 2 in response to an image transfer request to be displayed at a light-emission-detected position in imaging frames. As a result of this configuration, a correspondence relationship between a peripheral camera 2 and a captured image is clarified.

Second Embodiment

A second embodiment of the present invention is described below with reference to FIG. 6 and FIG. 7.

In the example of the above-described first embodiment, light emission from one peripheral camera 2 is detected, or in other words, a single camera ID is identified. However, in the second embodiment, light emissions from a plurality of peripheral cameras 2 are simultaneously detected, or in other words, a plurality of camera IDs are simultaneously identified. The second embodiment is characterized by processing for receiving captured images transmitted from peripheral cameras 2 as a highlight imaging operation and displaying these images on a live view screen. Here, sections of the second embodiment that are basically and nominally similar to those of the first embodiment are provided with the same reference numerals, and therefore descriptions thereof are omitted. Hereafter, characteristic portions of the second embodiment are mainly described.

Figure 6:
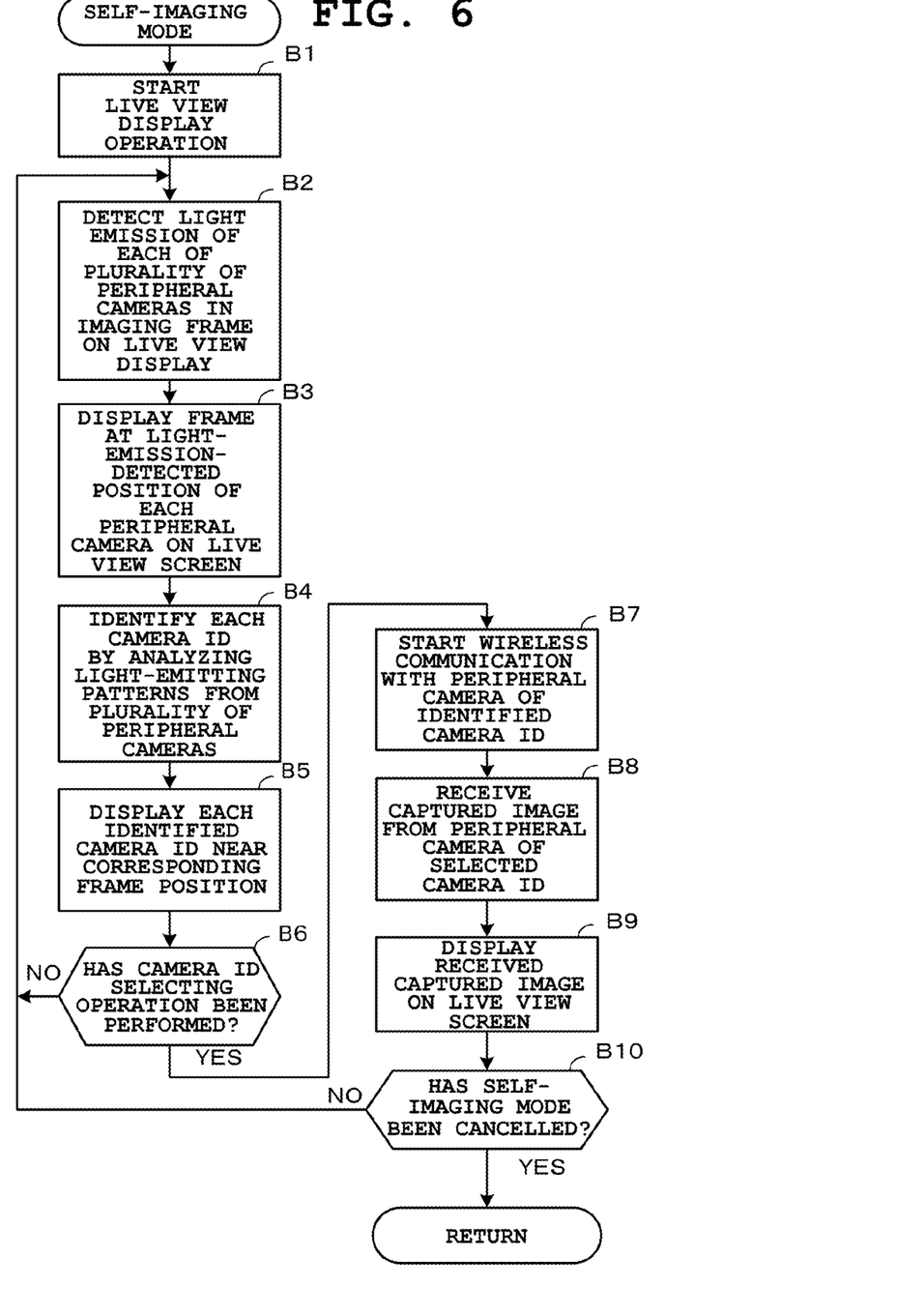
FIG. 6 is a flowchart of operation in a self-imaging mode in a second embodiment.
Figure 7:
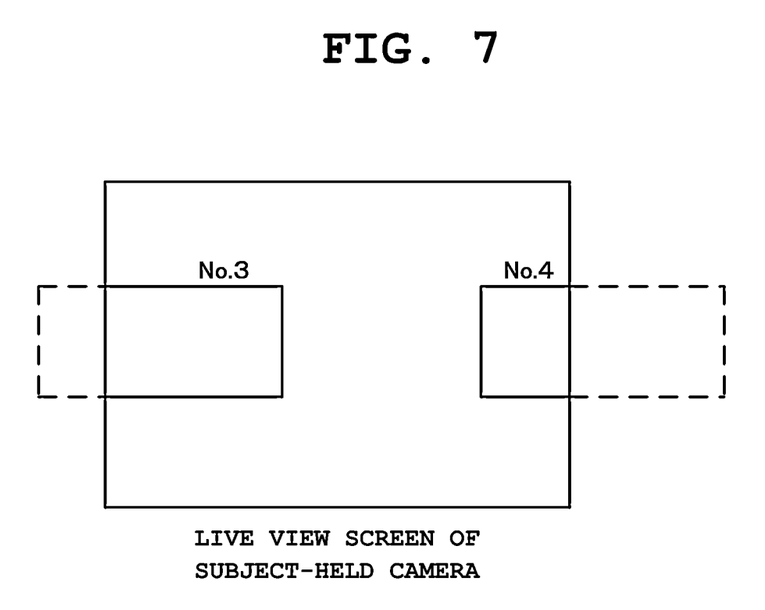
FIG. 7 is a diagram depicting a state in which a plurality of peripheral cameras 2 have been displayed on a live view screen in the second embodiment.

FIG. 6 is a flowchart of operation in the self-imaging mode of the subject-held camera 1 in the second embodiment, which is started when a current mode is switched to the self-imaging mode.

First, when a current mode is switched to the self-imaging mode, the control section 11 of the subject-held camera 1 starts a live view display operation to sequentially display, on the monitor screen, images in imaging frames captured in the image sensor as a live view image (Step B1). Subsequently, the control section 11 performs processing for detecting light emitted from the light-emitting section 2b of each of the plurality of peripheral cameras 2 in the imaging frames where the live view image is being displayed (Step B2), or in other words, processing for detecting a plurality of light emissions included in one imaging frame.

The control section 11 then causes a frame (rectangular frame) of a predetermined size to be displayed at each light-emission-detected position on the live view screen (imaging frame) (Step B3). FIG. 7 is a diagram depicting a live view screen when two adjacent peripheral cameras 2 are simultaneously imaged. In FIG. 7, not only a desired peripheral camera 2 of "No. 3" but also its adjacent peripheral camera 2 of "No. 4" has been shown on the live view screen, and two frames have been displayed corresponding to these two peripheral cameras 2. Note that, depending on the size and display position of each frame, the frame partially strays from the imaging frame.

Next, the control section 11 analyzes the light-emitting pattern (blinking pattern) of each light-emission portion and determines each camera ID (Step B4). Subsequently, the control section 11 causes part of the data of each identified camera ID ("No. 1 to No. 5" each indicating an arrangement position) to be displayed near the respective displayed frames on the live view screen (Step B5). In the display example of FIG. 7, partial data "No. 3" and "No. 4" of camera IDs are displayed near the frames of two peripheral cameras 2 included in a live view screen.

Then, with the plurality of camera IDs being displayed on the live view screen as described above, the control section 11 judges whether an operation of arbitrarily selecting the display position of one of the camera IDs has been performed (Step B6). For example, the control section 11 judges whether the display position of a camera ID displayed on the live view screen (touch screen) of the touch display section 16 has been touched. When judged that a touch operation of selecting a camera ID has not been performed (NO at Step B6), the control section 11 returns to Step B2 described above. When judged that a touch operation of selecting a camera ID has been performed (YES at Step B6), the control section 11 starts wireless communication between a peripheral camera 2 indicated by the selected camera ID and the subject-held camera 1 (Step B7). In addition, the control section 11 starts a cooperative imaging operation, and receives a captured image transmitted from the peripheral camera 2 (Step B8). Subsequently, the control section 11 displays the captured image on the live view screen (Step B9), and judges whether the self-imaging mode has been cancelled (Step B10). Then, until the self-imaging mode is cancelled, the control section 11 repeatedly returns to Step B2 described above and continues the light detection processing. That is, the control section 11 repeats the above-described operations until the self-imaging mode is cancelled.

As described above, in the second embodiment, when light emission is detected at a plurality of positions in imaging frames, the subject-held camera 1 identifies a plurality of camera IDs by individually analyzing each light-emitting pattern, and selects a peripheral camera 2 indicated by a camera ID arbitrarily specified from among the plurality of camera IDs as a processing target. As a result of this configuration, even when the subject-held camera 1 is directed toward a plurality of peripheral cameras 2 for imaging, only one peripheral camera 2 among them can be selected as a processing target.

Also, when a plurality of camera IDs are identified, the subject-held camera 1 displays the camera IDs which correspond to a plurality of light-emitting positions (detection positions) in imaging frames. Then, when one of the detection positions is arbitrarily specified, the subject-held camera 1 selects a peripheral camera 2 indicated by a camera ID at the specified position as a processing target. As a result of this configuration, a peripheral camera 2 desired by the user can be selected as a processing target.

Third Embodiment

A third embodiment of the present invention is described below with reference to FIG. 8.

In the first embodiment described above, when a camera ID is being sequentially identified, a peripheral camera 2 indicated by the latest camera ID identified at the timing of performing an operation of instructing to start a cooperative imaging operation is selected as a processing target. However, in the third embodiment, only by the subject-held camera 1 being directed toward a peripheral camera 2 at a desired position, the peripheral camera 2 indicated by the camera ID can be selected as a processing target, without an operation of instructing to start a cooperative imaging operation. The third embodiment is characterized by processing for receiving captured images transmitted from a peripheral camera 2 as a highlight imaging operation and displaying these images on a live view screen. Here, sections of the third embodiment that are basically and nominally similar to those of the first embodiment are provided with the same reference numerals, and therefore descriptions thereof are omitted. Hereafter, characteristic portions of the third embodiment are mainly described.

Figure 8:
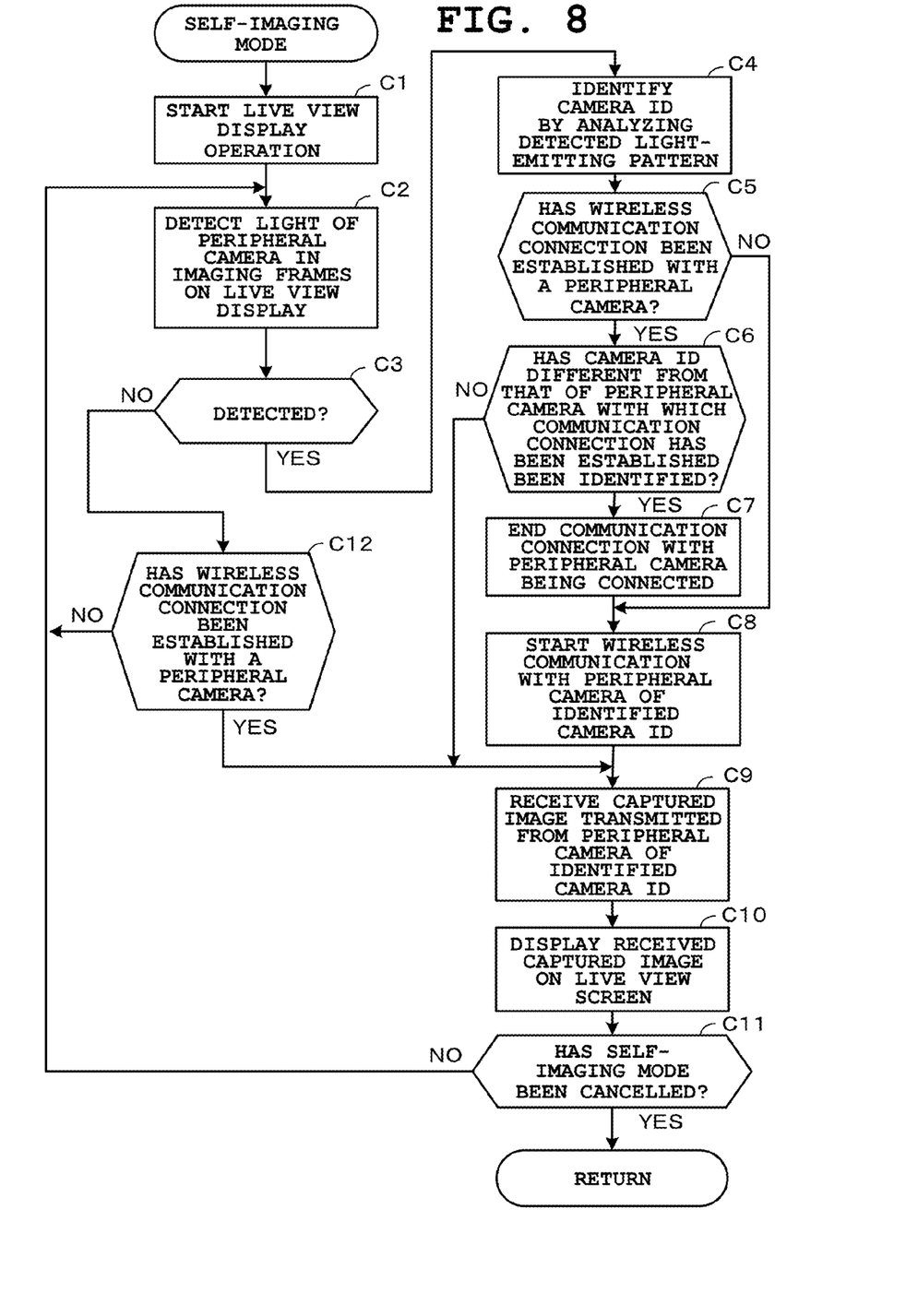
FIG. 8 is a flowchart of operation in a self-imaging mode in a third embodiment.

FIG. 8 is a flowchart of operation in the self-imaging mode of the subject-held camera 1 in the third embodiment, which is started when a current mode is switched to the self-imaging mode.

First, when a current mode is switched to the self-imaging mode, the control section 11 of the subject-held camera 1 starts a live view display operation to sequentially display, on the monitor screen, images in imaging frames captured in the image sensor as a live view image, as with the first embodiment described above (Step C1). Subsequently, the control section 11 detects whether light emitted from the light-emitting section 2b of a peripheral camera 2 is included in the imaging frames where the live view image is being displayed (Step C2), and then judges whether light has been detected (Step C3). When judged that light emitted from the light-emitting section 2b of a peripheral camera 2 has not been detected (NO at Step C3), the control section 11 proceeds to Step C11 and judges whether the self-imaging mode has been cancelled. Hereafter, until the self-imaging mode is cancelled, the control section 11 repeatedly returns to Step C2 described above, and continues the light detection processing.

At Step C3, when judged that light emitted from the light-emitting section 2b of a peripheral camera 2 has been detected (YES at Step C3), the control section 11 sequentially detects the change of light in each imaging frame on a time-series basis, analyzes a light-emitting pattern of the changes, and thereby identifies the camera ID (Step C4). Subsequently, the control section 11 judges whether a wireless communication connection has been established with any peripheral camera 2 (Step C5). When judged that a communication connection has not been established with any peripheral camera 2 (NO at Step C5), that is, when the camera ID has been identified without a wireless connection being established with any peripheral camera 2, the subject-held camera 1 starts wireless communication between a peripheral camera 2 indicated by the identified camera ID and the subject-held camera 1 (Step C8), and also starts a cooperative imaging operation. Subsequently, the subject-held camera 1 receives a captured image transmitted from the peripheral camera 2 (Step C9) and displays it on the live view screen (Step C10). Then, the control section 11 judges whether the self-imaging mode has been cancelled (Step C11). Hereafter, until the self-imaging mode is cancelled, the control section 11 repeatedly returns to Step C2 described above, and continues the light detection processing.

In a case where a communication connection has been established with a peripheral camera 2 (YES at Step C5) when the camera ID is identified (Step C4), the control section 11 judges whether the camera ID indicates the peripheral camera 2 with which the communication connection has been established, or in other words, judges whether a camera ID has been identified which is different from the ID of the peripheral camera 2 with which the communication connection has been established (Step C6). Here, when judged that the camera ID of another camera has been identified which is different from the peripheral camera 2 with which the communication connection has been established (YES at Step C6), the control section 11 ends the communication connection with the peripheral camera 2 (Step C7), and switches the communication connection by starting wireless communication with the peripheral camera 2 indicated by the currently identified camera ID (Step C8). Then, the control section 11 receives a captured image transmitted from this peripheral camera 2 (Step C9), and displays it on the live view screen (Step C10).

Also, when a communication connection has been established with a peripheral camera 2 (YES at Step C5) and the identified camera ID is the ID of the peripheral camera 2 with which the communication connection has been established (NO at Step C6) that is, when the subject-held camera 1 has been directed toward the peripheral camera 2 with which the communication connection has been established, the control section 11 proceeds to Step C9, continues the communication connection with this peripheral camera 2, receives a captured image transmitted from the peripheral cam a 2, and displays it on the live view screen (Step C10).

At Step C3, when judged that light emission from a peripheral camera 2 has not been detected (NO at Step C3), the control section 11 judges whether a wireless communication connection has been established with any peripheral camera 2 (Step C12).

Here, when judged that a communication connection has not been established with any peripheral camera 2 (NO at Step C12), the control section 11 returns to Step C2 described above. Conversely, when judged that a communication connection has been established (YES at Step C12), that is, when the orientation of the subject-held camera 1 communicating with a peripheral camera 2 is changed from the direction of this peripheral camera 2, the control section 11 proceeds to Step C9 to continue a highlight imaging operation with the peripheral camera 2, receives a captured image transmitted from the peripheral camera 2, and displays it on the live view screen (Step C10). Then, the control section 11 judges whether the self-imaging mode has been cancelled (Step C11). Hereafter, until the self-imaging mode is cancelled, the control section 11 repeatedly returns to Step C2 described above and repeats the above-described operations.

As described above, in the third embodiment, when sequentially identifying a camera ID by analyzing a light-emitting pattern in imaging frames, the subject-held camera 1 selects a peripheral camera 2 indicated by the latest identified camera ID as a processing target. As a result of this configuration, when the orientation of the subject-held camera 1 is changed (when the orientation of the subject-held camera 1 is changed from the direction of a peripheral camera 2 to that of another peripheral camera 2), the communication counterpart can be changed in real time according to the change, and a highlight imaging operation can be started with a new counterpart. In this case, after wireless communication with a peripheral camera 2 is started, if the subject-held camera 1 is not directed toward another peripheral camera 2, the communication with the peripheral camera 2 can be continued without the subject-held camera 1 being continuously directed toward the peripheral camera 2 with which the communication connection has been established.

In the above descriptions of the third embodiment, a case has not been described in which light emissions from the plurality of peripheral cameras 2 are respectively detected. In this case, a configuration may be adopted in which, when a plurality of light emissions are detected, the subject-held camera 1 regards one of the detected positions as valid based on a positional relation among the plurality of light emissions in the imaging frame, identifies the camera ID from the light-emitting pattern, and selects a peripheral camera 2 indicated by the camera ID as a processing target. For example, a configuration may be adopted in which, when a plurality of light emissions are simultaneously detected in an imaging frame, the subject-held camera 1 regards a detected position near the center portion (or another desired portion) of the imaging frame as valid from among the plurality of detected positions, and identifies the camera ID. As such, by the configuration where a detected position near the center of an imaging frame is regarded as valid and the camera ID is identified, even when the plurality of peripheral cameras 2 have been arranged adjacent to each other, a processing target can be selected only by image capturing being performed centering on a desired peripheral camera 2.

Also, a configuration may be adopted in which camera-ID identifying processing is performed on light-emitting portions at all detected positions, a correspondence relationship between the plurality of positions and the plurality of camera IDs are identified, a camera ID corresponding to a position nearest to the center of the imaging frame among the plurality of correspondence-identified positions is selected as a processing target. Also, in addition to the case where a plurality of light emissions are simultaneously detected in an imaging frame, the camera-ID identifying processing may be sequentially performed on light-emitting portions sequentially (not simultaneously) detected while the imaging direction is being changed, a correspondence between the plurality of imaging directions (positions) and the plurality of camera IDs may be identified, and a camera ID corresponding to a direction nearest to the center imaging direction may be selected as a processing target.

Moreover, a configuration may be adopted in which a plurality of detection positions in an imaging frame are regarded as valid in a predetermined sequence (for example, a sequence from one end to the other end of the imaging frame), and the camera IDs are sequentially identified. As such, by the configuration where a plurality of detection positions are regarded as valid in a predetermined sequence and the camera IDs are sequentially identified, a plurality of peripheral cameras 2 can be sequentially selected as processing targets. As a result, from images sequentially received from the plurality of peripheral cameras 2, a combined image can be generated. In this case, the user may change the viewing angle so that the plurality of peripheral cameras 2 are imaged in one imaging frame, or may change the imaging direction accordingly so that one peripheral camera 2 is imaged in one imaging frame.

Also, in a case where camera-ID identifying processing is performed on light-emitting portions at all detected positions; a correspondence between the plurality of positions and the plurality of camera IDs is identified thereby (for example, a camera ID corresponding to the leftmost light-emitting portion is "No. 3", a camera ID corresponding to the center light-emitting portion is "No. 1", and a camera ID corresponding to the rightmost light-emitting portion is "No. 5"); captured images are acquired from peripheral cameras 2 having these camera IDs; and the acquired images are combined (aligned and displayed) with a positional relation matching the alignment of the peripheral cameras 2 (the alignment of the positions where the light-emitting portions have been detected), the alignment of these acquired images may be determined based on the identified correspondence between the plurality of positions and the plurality of camera IDs. For example, the alignment of the captured images may be determined and combined such that a captured image acquired from the peripheral camera 2 of "No. 3" comes leftmost, a captured image acquired from the peripheral camera 2 of "No. 1" comes at the center, and a captured image acquired from the peripheral camera 2 of "No. 5" comes rightmost.

In each of the above-described embodiments, the subject-held camera 1 performs transfer processing for requesting a peripheral camera 2 selected as a processing target to transfer an image captured by this peripheral camera 2, and loading the captured image transmitted in response to the request. However, the predetermined processing is not limited to this transfer processing. For example, the predetermined processing may be synchronization processing for synchronizing the imaging timing of a peripheral camera 2 selected as a processing target and the imaging timing of the subject-held camera 1 with each other. Here, the imaging timing of the subject-held camera 1 and the imaging timing of the peripheral camera 2 may be synchronized with each other, or still-image capturing and moving-image capturing may be synchronized with each other. By performing this synchronization processing, the user can enjoy various imaging, such as exchanging his or her own image and a counterpart's image in real time.

Also, in each of the above-described embodiments, "No. 1 to No. 5" indicating the arrangement positions of the peripheral cameras 2 have been described as examples of the camera IDs. However, the camera IDs are not limited to the camera arrangement positions, and may be azimuths or directions in which the peripheral cameras 2 have been arranged, camera names or abbreviations, or the like. That is, the camera IDs may be any information as long as arrangement positions can be intuitively grasped from the camera IDs.

Moreover, in each of the above-described embodiments, the camera IDs are displayed at light-emission-detected positions in imaging frames. However, the camera IDs may be displayed by being superimposed on the center portions of images of the peripheral cameras 2 in imaging frames. It is only required that the camera IDs are displayed at positions where a correspondence relationship with a peripheral camera 2 can be easily understood.

Furthermore, in each of the above-described embodiments, a light-emitting pattern emitted from a peripheral camera 2 has been exemplarily described as predetermined information by which a camera ID identifying a peripheral camera 2 can be identified. However, the predetermined information not limited to the light-emitting pattern that changes with time, and may be a light-emitting pattern that changes spatially, a label printed with a bar code indicating a camera ID, or a label printed with a numerical value string or character string indicating a camera ID. In this case, the subject-held camera 1 analyzes images in imaging frames, recognizes a bar code, a numerical value string, or a character string therein, and causes the recognition result to be displayed.

Still further, in each of the above-described embodiments, the present invention has been applied in a digital camera as an imaging apparatus. However, the present invention is not limited thereto, and may be applied in a smartphone, personal computer (personal portable information communication device), tablet terminal, electronic wristwatch, or the like having an imaging function.

While the present invention has been described with reference to the preferred embodiments, is tended that the invention be not limited by any of the details of the description therein but includes all the embodiments which fall within the scope of the appended claims.

What is claimed is:

1. An imaging apparatus capable of wireless communication, the apparatus comprising:
an imaging section which comprises an image sensor and which is configured to image a peripheral imaging apparatus from among a plurality of peripheral imaging apparatuses around the imaging apparatus; and
a control section which comprises a CPU and which is configured to:
detect, from within imaging frames imaged by the imaging section, a predetermined image portion which corresponds to the peripheral imaging apparatus and in which one of (i) a light-emitting pattern that changes with time or spatially and that indicates identification information which identifies the peripheral imaging apparatus, and (ii) a label that indicates the identification information which identifies the peripheral imaging apparatus, wherein the label includes one of (a) a label printed with a bar code, and (b) a label printed with a numerical value string or a character string, is imaged, wherein the peripheral imaging apparatus is identified based on the imaged one of the light-emitting pattern and the label, and wherein the imaged one of the light-emitting pattern and the label is used for wireless communication;
identify the one of the light-emitting pattern and the label by analyzing the detected predetermined image portion;
select the peripheral imaging apparatus to be a target for predetermined processing from among the plurality of peripheral imaging apparatuses via the wireless communication by using the identified one of the light-emitting pattern and the label; and
perform the predetermined processing with the selected peripheral imaging apparatus via the wireless communication.

2. The imaging apparatus according to claim 1, wherein the control section is further configured to:
detect the predetermined image portion in which the one of the light-emitting pattern and label of said selected peripheral imaging apparatus is imaged, when one of a light-emitting pattern and a label is assigned in advance to each of the plurality of peripheral imaging apparatuses and when the one of the light-emitting pattern and the label of said each peripheral imaging apparatus is imageable as visible light, and
identify the one of the light-emitting pattern and the label by analyzing the visible light.

3. The imaging apparatus according to claim 1, wherein the control section is further configured to:
sequentially detect predetermined image portions,
sequentially identify light-emitting patterns or labels by analyzing the sequentially-detected image portions, and
select, as the target for the predetermined processing, one of the plurality of peripheral imaging apparatuses corresponding to a latest identified one of the light-emitting pattern and the label.

4. The imaging apparatus according to claim 1, wherein the control section is further configured to:
sequentially detect predetermined image portions,
sequentially identify light-emitting patterns or labels by analyzing the sequentially-detected image portions, and
display the sequentially identified light-emitting patterns or labels on a live view screen of a display section of the imaging apparatus.

5. The imaging apparatus according to claim 1, wherein the control section is further configured to:
sequentially detect predetermined image portions,
sequentially identify light emitting-patterns or labels by analyzing the sequentially-detected image portions, and
select, as the target for the predetermined processing, one of the plurality of peripheral imaging apparatuses corresponding to a latest identified one of the light emitting-pattern and the label.

6. The imaging apparatus according to claim 1, wherein the predetermined processing is processing for synchronizing imaging timing of the peripheral imaging apparatus selected as the processing target with imaging timing of the imaging apparatus.

7. The imaging apparatus according to claim 1, wherein the control section is further configured to, when a plurality of predetermined image portions corresponding to a plurality of the peripheral imaging apparatuses are detected, regard a detection position of one of the plurality of detected predetermined image portions as valid based on a positional relation among the plurality of detected predetermined image portions in the imaging frames, and identify the one of the light emitting-pattern and the label by analyzing said one of the plurality of detected predetermined image portions at the detection position regarded as valid.

8. The imaging apparatus according to claim 1, wherein the control section is further configured to:
when a plurality of predetermined image portions corresponding to a plurality of the peripheral imaging apparatuses are detected at a plurality of positions in the imaging frames, identify a plurality of light-emitting patterns or labels by individually analyzing the respective detected plurality of predetermined image portions, and
when the plurality of light-emitting patterns or labels are identified, select one of the peripheral imaging apparatuses indicated by one of the plurality of light-emitting patterns or labels arbitrarily specified as the target for the predetermined processing.

9. The imaging apparatus according to claim 8, wherein the control section is further configured to:
display the identified plurality of light-emitting patterns or labels on positions corresponding to the respective detected plurality of predetermined image portions in the imaging frames displayed in a display section of the imaging apparatus, and
when a detection position of one of the identified plurality of light-emitting patterns or labels being displayed is arbitrarily specified, select one of the plurality of peripheral imaging apparatuses indicated by said one of the identified plurality of light-emitting patterns or labels at the specified detection position as the target for the predetermined processing.

10. The imaging apparatus according to claim 1, wherein the predetermined processing is processing for requesting the peripheral imaging apparatus selected as the processing target to transfer an image captured by the peripheral imaging apparatus, and loading the captured image transmitted in response to the request.

11. The imaging apparatus according to claim 10, wherein the predetermined processing is processing for displaying, on a detection position of the detected predetermined image portion in the imaging frames, the loaded captured image.

12. The imaging apparatus according to claim 1, wherein the control section is further configured to:
identify, when a plurality of predetermined image portions corresponding to a plurality of the peripheral imaging apparatuses are detected at a plurality of positions in the imaging frames, a plurality of light-emitting patterns or labels by individually analyzing the respective plurality of detected predetermined image portions;

select, when the plurality of light-emitting patterns or labels are identified, one of the plurality of peripheral imaging apparatuses indicated by one of the plurality of light-emitting patterns or labels arbitrarily specified from among the plurality of light-emitting patterns or labels as the target for transfer processing of data via the wireless communication; and perform, with the selected one of the plurality of peripheral imaging apparatuses, the transfer processing of the data via the wireless communication by using the one of the light-emitting pattern and label corresponding to the selected peripheral imaging apparatus.

13. The imaging apparatus according to claim 12, wherein the transfer processing of the data is processing for requesting the peripheral imaging apparatus selected as the processing target to transfer an image captured by the selected peripheral imaging apparatus by using the identified one of the light-emitting pattern and the label, and loading the captured image transmitted in response to the request by using the identified one of the light-emitting pattern and the label.

14. An imaging method of an imaging apparatus, the method comprising:

imaging a peripheral imaging apparatus from among a plurality of peripheral imaging apparatuses around the imaging apparatus;

detecting, from within imaged imaging frames, a predetermined image portion which corresponds to the peripheral imaging apparatus and in which one of (i) a light-emitting pattern that changes with time or spatially and that indicates identification information which identifies the peripheral imaging apparatus, and (ii) a label that indicates the identification information which identifies the peripheral imaging apparatus, wherein the label includes one of (a) a label printed with a bar code, and (b) a label printed with a numerical value string or a character string, is imaged, wherein the peripheral imaging apparatus is identified based on the one of the light-emitting pattern and the label, and wherein the one of the light-emitting pattern and the label is used for wireless communication;

identifying the one of the light-emitting pattern and the label by analyzing the detected predetermined image portion;

selecting the peripheral imaging apparatus to be a target for predetermined processing from among the plurality of peripheral imaging apparatuses via the wireless communication by using the identified one of the light-emitting pattern and the label; and performing the predetermined processing with the selected peripheral imaging apparatus via the wireless communication.

15. A non-transitory computer-readable storage medium having stored thereon a program that is executable by a computer of an imaging apparatus, the program being executable by the computer to perform functions comprising:

imaging a peripheral imaging apparatus from among a plurality of peripheral imaging apparatuses around the imaging apparatus;

detecting, from within imaged imaging frames, a predetermined image portion which corresponds to the peripheral imaging apparatus and in which one of (i) a light-emitting pattern that changes with time or spatially and that indicates identification information which identifies the peripheral imaging apparatus, and (ii) a label that indicates the identification information which identifies the peripheral imaging apparatus, wherein the label includes one of (a) a label printed with a bar code, and (b) a label printed with a numerical value string or a character string, is imaged, wherein the peripheral imaging apparatus is identified based on the one of the light-emitting pattern and the label, and wherein the one of the light-emitting pattern and the label is used for wireless communication;

identifying the one of the light-emitting pattern and the label by analyzing the detected predetermined image portion;

selecting the peripheral imaging apparatus to be a target for predetermined processing from among the plurality of peripheral imaging apparatuses via the wireless communication by using the identified one of the light-emitting pattern and the label; and performing the predetermined processing with the selected peripheral imaging apparatus via the wireless communication.

\* \* \* \* \*